Patented Aug. 30, 1949

2,480,514

UNITED STATES PATENT OFFICE 2,480,514

PREPARATION OF INFUSIBLE RESINS

John Kenson Simons, Toledo, Ohio, assignor, by mesne assignments, to Libbey-Owens-Ford Glass Company, a corporation of Ohio No Drawing. Application March 30, 1942, Serial No. 436,839

11 Claims. (Cl. 260—67.5)

The invention relates to the preparation of novel infusible resins by reaction of formaldehyde or its polymers with derivatives of dicyandiamide

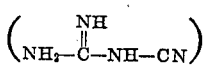

Nearly all the known resins formed by the reaction of formaldehyde with various compounds are without practical value because of undesirable color or physical properties, or poor heat resistance, water resistance or light resistance. Most of them are thermoplastic or so slowly thermosetting that they may be regarded for all practical purposes as thermoplastic.

Formaldehyde reacts with many compounds containing amidine

groups. However, compounds containing such groups usually are extremely basic, and are easily hydrolyzed. For these reasons, the reaction products of such compounds with formaldehyde tend to be highly unstable.

The heterocyclic compound guanazole, which has the following structural formula:

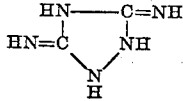

or

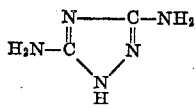

contains amidine groups, but is less basic and more stable than acyclic compounds containing amidine groups. Guanazole can be prepared by reacting dicyandiamide with hydrazine hydrate, but the yield of guanazole is low and uncertain. Moreover, the formation of guanazole takes place very slowly, with the simultaneous production of soluble colored products which are difficult to separate from the guanazole. Hence it is not feasible at present to prepare guanazole in sufficiently pure form for use in the commercial production of a synthetic resin by reaction with formaldehyde.

Phenyl guanazole, having the structural formula:

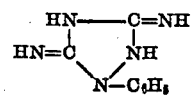

or

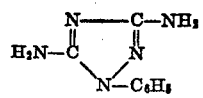

also reacts with formaldehyde to form a resin, but the resin is unsatisfactory in that it is rapidly discolored by exposure to daylight or to a moderately elevated temperature.

The principal object of the invention is the preparation, by reaction of formaldehyde and dicyandiamide derivatives, of novel resins that are colorless, infusible, insoluble, unaffected by light, water-resistant and heat-resistant. More specific objects and advantages are apparent from the description, which discloses and illustrates the invention and is not intended to impose limitations upon the claims.

The dicyandiamide derivatives that are reacted with formaldehyde in accordance with the invention to produce novel resins can be obtained readily in pure form and in good yields. They are prepared by reacting dicyandiamide with a hydrazide of an organic acid. Resins that have widely varied properties and are therefore suitable for various uses may be prepared in accordance with the invention, because a large variety of hydrazides may be used for the reaction with dicyandiamide to give various dicyandiamide derivatives that may be reacted with formaldehyde to produce resins.

The reaction between the dicyandiamide and the hydrazide is preferably carried out in aqueous solution. Ammonia is liberated in the reaction, and it is therefore preferable to carry out the reaction under acid conditions in order that the liberated ammonia may be converted into an ammonium salt. The degree of acidity used is simply that acidity which is sufficient to cause the conversion of the desired amount of ammonia to the ammonium salt. Of course the acidity should not be so great as to cause excessive hydrolysis of the reaction product.

The proportion of dicyandiamide to hydrazide used for the reaction may be varied within wide limits, but it is believed that the proportion that actually takes part in the reaction is 1 mol of dicyandiamide for each mol of the hydrazide.

The reaction proceeds at ordinary temperatures, but can be carried out more expeditiously at about 100° C. The hydrazides which may be used for the reaction with dicyandiamide consist of substances having the general formula $$A-NH-NH_2$$

in which A is selected from the group consisting of

$R_1$ is selected from the group consisting of

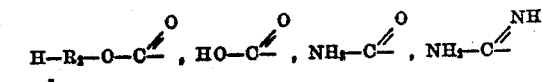

and

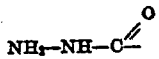

$R_2$ is selected from the group consisting of alkylene, arylene, polymethylene, alkylene aryl and arylene alkyl, and $R_3$ is selected from the group consisting of —NH—, —NH—NH— and $R_2$. Examples of hydrazides that may be used are the hydrazide of an alkyl carboxylic, aryl carboxylic, arylalkyl carboxylic or alkylaryl carboxylic acid. The mono- or dihydrazide of a dicarboxylic acid or the monohydrazide of the monoamidine, monoamide, or monoester of a dicarboxylic acid may also be used.

Because of their relative insolubility and high melting points, the compounds obtained by this reaction are believed to be cyclic compounds. They may have the general structural formula:

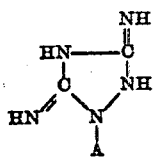

or

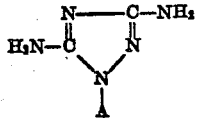

in which A is

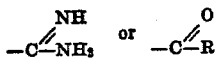

R having the same significance as $R_1$, $R_1-R_2-$ or $HR_3$ in the general formula mentioned above.

Thus if the hydrazide reacted with dicyandiamide is semicarbazide, i. e., if, in the general formula for the hydrazide in the next to the last paragraph, A is

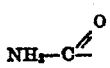

the resulting carbon compound would be 1-carbamyl guanazole, having the structural formula:

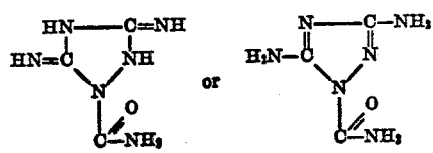

If the hydrazide reacted with dicyandiamide is aminoguanidine, i. e., if, in the general formula for the hydrazide A is

the resulting carbon compound would be 1-guanyl guanazole, having the structural formula:

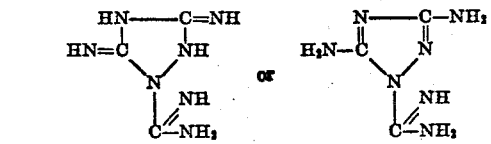

Such compounds and their preparation are claimed in application Ser. No. 436,485, filed March 27, 1942 and now Patent No. 2,456,090 December 14, 1948.

In accordance with the invention, the compounds so prepared may be reacted either with formaldehyde or with a polymer thereof such as paraformaldehyde. Preferably, they are reacted with a solution of formaldehyde in water, in an organic solvent such as an alcohol, or in a liquid containing both water and an organic solvent. If an organic solvent such as ethyl, methyl, propyl or butyl alcohol is employed, the solution of an intermediate reaction product that is obtained is suitable for use in lacquers, and the reaction may be performed in an autoclave if desired, to secure a reaction temperature above the boiling point of the solvent.

*Intermediate Reaction Product*

When a formaldehyde solution is used for the reaction with the dicyandiamide derivative, the solution is preferably about neutral at the start of the reaction, although the reaction may be carried out in an acid or alkaline solution. Since commercial formaldehyde is strongly acid, a base is ordinarily added to bring the initial pH of the reaction solution to the desired value. Any desired base may be employed. A maximum of approximately 2 mols of formaldehyde usually reacts with each mol of the dicyandiamide derivative, but an excess of formaldehyde above 2 mols, or a smaller proportion ranging down to 1.5 mols, or even 1 mol of formaldehyde for each mol of the dicyandiamide derivative may be used for the reaction if desired. Because of the complexity of the molecules of reaction product that are produced, the proportion of formaldehyde actually reacting with each mol of the dicyandiamide derivative can vary from approximately 1 mol to approximately 2 mols or in some cases 3 mols.

The reaction proceeds at ordinary temperatures, but is expedited by heating or refluxing the mixture. An intermediate reaction product may be prepared by carrying the reaction of the formaldehyde and the dicyandiamide derivative only to its earliest stage, for example, the stage at which the reacting ingredients have just dissolved to form a solution, or the reaction or condensation may be carried to any further stage (short of the final infusible resinous stage) at which the product may still be called an intermediate reaction product. By thus advancing the reaction, it is possible to obtain an intermediate reaction product that is insoluble but still fusible.

For many purposes it is convenient to allow the soluble type of intermediate reaction product to remain in the form of a solution. Such a solution, after the addition of any desired ingredients, may be used as a binder in the production of impregnated or laminated products, as an adhesive for applications such as the manufacture of plywood, as a dressing or crease-proofing agent for textiles, as an ingredient for lacquers or coating compositions, as a flame-proofing agent for wood, and as a composition to be converted into a foam that can be hardened to produce an insulating material.

An intermediate reaction product may be obtained in dry form from a solution by vacuum evaporating the solution or diluting it with water, to adjust its concentration to the proper value, and then spray-drying or vacuum drum-drying. It is usually more convenient to ship or store an intermediate reaction product in dry form than in the form of a solution. Various ingredients such as fillers, pigments and hardening catalysts may be mixed with a dry intermediate reaction product so that a coating compound, adhesive, binder or impregnating agent of the desired composition may be obtained by simply adding water or other solvent to the dry mixture.

The product is most stable in storage when it is substantially neutral. Thus it is desirable to neutralize a solution of an intermediate reaction product before spray-drying or vacuum drum-drying.

An acid catalyst may be used in hardening or converting the intermediate reaction product into an infusible resin. Since the action of the catalyst is due solely to its acidity, any acid substance, such as an inorganic acid, an organic acid, or an acid salt such as an ammonium salt of a strong inorganic acid, may be used as the catalyst. The acidity may be furnished by mere addition of an acid substance to the intermediate reaction product, but acidity to catalyze the conversion of the intermediate reaction product to an infusible resin is preferably provided by incorporating a latent acid catalyst with the intermediate reaction product. A latent acid catalyst is a substance which, after being added to the intermediate reaction product, remains substantially neutral so long as the reaction product is stored at ordinary temperatures, but decomposes or reacts to generate acidity when the intermediate reaction product is heated in the operation of converting it into an infusible resin. The degree of acidity employed during the hardening of the intermediate reaction product is simply that acidity which causes the intermediate reaction product to harden at the desired rate.

Example 1

448 grams (4 mols) of semicarbazide hydrochloride

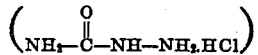

and 336 grams (4 mols) of dicyandiamide are added to 1 liter of water, and the mixture is heated. As the boiling point is approached, an exothermic reaction begins which keeps the liquid boiling for about 5 minutes. At the end of the 5 minutes, a precipitate begins to form, and the solution is refluxed for an additional period of 15 minutes. The mixture is then cooled, and the solid (280 grams) is filtered off. The solid, which is only slightly soluble in water, decomposes at 230–235° C. The product can be purified by extracting with 500 c. c. of water at room temperature to give 175 grams of the purified product, which decomposes at 240–245° C.

To prepare an aqueous solution of an intermediate reaction product embodying the invention, 1 mol (142 grams) of the dicyandiamide derivative so prepared is refluxed with 2 mols of a 37 per cent aqueous solution of formaldehyde, whose pH has initially been adjusted to 7.6, for about ½ hour. The resulting solution remains clear on cooling.

Example 2

224 grams (2 mols) of semicarbazide hydrochloride, 168 grams (2 mols) of dicyandiamide and 500 c. c. of water are refluxed for 2 hours, and the solid (143 grams) is then filtered out of the hot solution. Washing with water at room temperature gives a yield of 110 grams of a product which shows no decomposition when heated up to 260° C., and which is substantially insoluble in water. Its structural formula may be as follows:

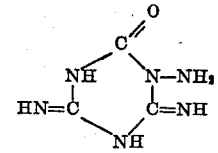

An additional 50 grams of this product can be obtained from the mother liquor by continued refluxing.

1 mol (142 grams) of the product so prepared is refluxed with 2½ mols of a 37 per cent aqueous solution of formaldehyde, whose pH has initially been adjusted to 7.6, until a clear solution is obtained (about ½ hour). When the resulting solution is cooled, the intermediate reaction product precipitates. It can be obtained in solid form by filtering it off and drying.

Example 3

A sufficient quantity of a 50 per cent aqueous solution of triethanolamine is added to 5 parts of 37 per cent formalin to bring the pH of the formalin to about 7.6. 2 parts of the dicyandiamide derivative decomposing at 240–245° C. prepared in accordance with Example 1 are then added, and the ingredients are refluxed for 13 minutes. Then, after the addition of an excess of methanol, the precipitate which forms is brought into solution by adding ½ part of maleic acid and agitating. An excess of n-butanol is then added, and the solution is boiled to distill out the methanol and water and part of the butanol, until a clear viscous resin is obtained. The resin is soluble in butanol or acetone. When spread in a film and baked, the resin is converted into a clear, hard, transparent, water-resistant coating.

Example 4

A clear resin is prepared by the procedure of Example 3, except that sodium hydroxide is used instead of triethanolamine, and oxalic acid is used instead of maleic acid. A film or coating of this resin can be baked at a higher temperature than a coating of the resin of Example 3, without discoloring.

Example 5

A similar clear resin is prepared by a procedure which is the same as that of Example 4 except that the dicyandiamide derivative used is the compound prepared in accordance with Example 2.

Example 6

53.8 grams (.64 mol) of dicyandiamide, 88.7 grams (.64 mol) of aminoguanidine nitrate

and 180 c. c. of water are refluxed for 2½ hours. The mixture is then chilled, and the solid is filtered off. Recrystallization from alcohol gives 68 grams of a product having a melting point of 123–125° C.

14 grams of the product so prepared are refluxed with 30 grams of a 37 per cent aqueous solution of formaldehyde, whose pH has initially been adjusted to 7.6, for about 10 minutes. The resulting solution remains clear on cooling. Chemical analysis of this solution indicates that about 2.4 mols of the formaldehyde have reacted with each mol of the dicyandiamide derivative. The same result is obtained by employing 25 instead of 30 grams of the aqueous formaldehyde solution. If 22 grams of the formaldehyde solution are employed for the 14 grams of the dicyandiamide derivative, the analysis indicates that about 2.3 mols of the formaldehyde have reacted with each mol of the dicyandiamide derivative.

Example 7

17.2 grams (0.1 mol) of benzohydrazide hydrochloride, 8.4 grams (0.1 mol) of dicyandiamide and 30 c. c. of water are refluxed for 1½ hours. The mixture is then cooled, and the solid reaction product is filtered off. After two recrystallizations from alcohol, a yield of 4 grams of the reaction product, melting at 223–225° C., is obtained. A further crop of 1 gram of the reaction product can be obtained after further refluxing of the filtrate.

.03 mols (5 grams) of the product so prepared and .06 mols of a 37 per cent aqueous solution of formaldehyde, whose pH has initially been adjusted to 7.6, are kept at approximately 100° C. for about ½ hour. An intermediate reaction product precipitates when the resulting solution is cooled.

PRODUCTION OF ARTICLES OF INFUSIBLE RESIN

Fillers, plasticizers, hot plate lubricants, opacifiers, dyestuffs, pigments and other coloring matter may be incorporated with the intermediate reaction product to produce a suitable molding composition. In the preferred method of preparing a molding composition, the filler is impregnated with a solution of a soluble intermediate reaction product, and the solvent is then removed.

If fibrous cellulosic material in the form of paper pulp, wood flour or the like is employed as the filler, an aqueous solution of the intermediate reaction product used for impregnating the cellulosic material is preferably rendered acid (pH of about 4 to about 6). Heat may be used to facilitate the drying of the impregnated cellulose or other filler. Of course the drying temperature should not be sufficient to render the molding composition infusible. After the water or other solvent has been removed, the dry product may be ground in a ball mill to produce a homogeneous powder, and modifiers, such as plasticizers, lubricants and pigments may be incorporated in the grinding operation. If desired, the powder may be compressed into blanks or preforms of the proper size for use in various molds. The molding composition may be employed in the usual manner for the production of molded articles by compressing it in a closed mold at a pressure of 1 to 4 tons per square inch of projected area and a temperature of about 150° C. for a period of 1 to 5 minutes.

Articles of infusible resin embodying the invention may be produced by methods other than preparing and hot-pressing a molding composition—for example, by casting in open molds and baking. In any case, if no filler is used, transparent articles can be produced.

Since the synthetic resins of the present invention are colorless, the intermediate reaction products that have been described can be incorporated with a great variety of other resins or potential resins. Also, reaction products of formaldehyde with mixtures of the dicyandiamide derivatives with one another and with other substances can be produced. The intermediate reaction products of formaldehyde with the dicyandiamide derivatives in the resulting compositions may then be converted into the infusible resins, and a blend or copolymer of different resins may be thus obtained.

Example 8

After 150 grams of the clear solution prepared in accordance with Example 1 has been brought to a pH of 6.0, it is used to impregnate 70 grams of shredded alpha-cellulose. The impregnated alpha-cellulose is then dried by subjecting it to a stream of dry air at 80–85° C. for 15 minutes. It is then ground in a ball mill and further dried for 10 minutes at the same temperature, to produce a molding powder.

Example 9

170 grams of the hot solution of the intermediate reaction product prepared in accordance with Example 2, at a pH between 4.5 and 6.5, and 70 grams of shredded alpha-cellulose are stirred together until the alpha-cellulose has been uniformly impregnated. The resulting mass is then dried by subjecting it to a stream of dry air at 80–85° C. for a period of 15–25 minutes, or to a stream of dry air at a lower temperature for a longer period of time. The dried product is ground to a powder in a ball mill, and the powder is compressed at ordinary temperatures into preforms of the desired size. Articles molded from this composition have better water resistance than articles molded from a molding powder prepared in accordance with Example 8.

Example 10

A solution prepared in accordance with Example 6 at a pH between 5.5 and 6.8 is used to impregnate 14 grams of shredded alpha-cellulose. The impregnated mass is dried by subjecting it to a stream of dry air for about 10 minutes at about 80° C., and is then ground in a ball mill to produce a molding powder.

Example 11

A sufficient quantity of a 50 per cent aqueous solution of triethanolamine is added to 15 parts of 37 per cent formalin to bring the pH of the formalin to about 7.6. The resulting solution, after the addition of 5 parts of the dicyandiamide derivative decomposing at 240–245° C. prepared in accordance with Example 1, is refluxed for 15 minutes. Analysis of the resulting solution indicates that 3.4 parts of the formaldehyde remain unreacted. This solution is evaporated at 110° C. for about 1½ hours, to produce a nearly solid resinous mass which is still soluble in water. A concentrated viscous solution is prepared by dissolving the mass in water, and sufficient concentrated hydrochloric acid is added to bring the pH of the solution slightly below 7. The solution is then poured into a mold and heated for several hours at 70–90° C. on a water bath until an insoluble resin has been formed. When exposed to the atmosphere at room temperature, the transparent casting thus produced shrinks somewhat in drying out, but does not crack.

Various embodiments of the invention may be devised to meet various requirements.

Having described my invention, I claim:

1. A method of producing an intermediate reaction product capable of conversion into an infusible resin that comprises reacting formaldehyde with a compound formed by the reaction of dicyandiamide with semicarbazide.
2. An intermediate reaction product of formaldehyde with a compound formed by the reaction of dicyandiamide with semicarbazide, capable of conversion into an infusible resin.
3. A resinous composition comprising the product of reaction of ingredients comprising formaldehyde and 1-carbamyl guanazole.
4. A resinous composition comprising the product of reaction of ingredients comprising formaldehyde and 1-guanyl guanazole.
5. The method of preparing new synthetic compositions which comprises effecting reaction between ingredients comprising formaldehyde and 1-carbamyl guanazole.
6. The method of preparing new synthetic compositions which comprises effecting reaction between ingredients comprising formaldehyde and 1-guanyl guanazole.
7. An alcohol-modified reaction product of ingredients comprising formaldehyde and 1-carbamyl guanazole.
8. A method of producing a synthetic resin that comprises reacting ingredients comprising formaldehyde and a compound formed by the reaction of dicyandiamide with a hydrazide having not more than two hydrazide radicals in the molecule, any atoms other than carbon, hydrogen and nitrogen in the molecule of such hydrazide consisting of oxygen atoms.
9. An intermediate reaction product of ingredients comprising formaldehyde and a compound formed by the reaction of dicyandiamide with a hydrazide having not more than two hydrazide radicals in the molecule, any atoms other than carbon, hydrogen and nitrogen in the molecule of such hydrazide consisting of oxygen atoms, capable of conversion into an infusible resin.
10. A resinous reaction product of ingredients comprising formaldehyde and a compound formed by the reaction of dicyandiamide with a hydrazide having not more than two hydrazide radicals in the molecule, any atoms other than carbon, hydrogen and nitrogen in the molecule of such hydrazide consisting of ozygen atoms.
11. An alcohol-modified reaction product of ingredients comprising formaldehyde and a compound formed by the reaction of dicyandiamide with a hydrazide having not more than two hydrazide radicals in the molecule, any atoms other than carbon, hydrogen and nitrogen in the molecule of such hydrazide consisting of oxygen atoms.

JOHN KENSON SIMONS.

REFERENCES CITED

The following references are of record in the file of this patent:

UNITED STATES PATENTS

| Number | Name | Date |
| --- | --- | --- |
| 2,197,357 | Widmer et al. | Apr. 16, 1940 |
| 2,218,077 | Zerweck | Oct. 15, 1940 |
| 2,295,567 | D'Alelio | Sept. 15, 1942 |
| 2,332,302 | D'Alelio | Oct. 19, 1943 |
| 2,352,944 | D'Alelio | July 4, 1944 |

FOREIGN PATENTS

| Number | Country | Date |
| --- | --- | --- |
| 475,072 | Great Britain | Nov. 12, 1937 |

OTHER REFERENCES

Micheel, Chemie der Zucker und Polysaccharide p. 188, Leipzig 1939.